United States Patent [19]

Aubourg et al.

[11] Patent Number: 4,483,592

[45] Date of Patent: Nov. 20, 1984

[54] LIQUID CRYSTAL OPTICAL VALVE CONTROLLED BY PHOTOCONDUCTING EFFECT

[75] Inventors: Philippe Aubourg; Jean P. Huignard; Michel Hareng, all of Paris, France

[73] Assignee: Thomson-CSF, Paris, France

[21] Appl. No.: 367,014

[22] Filed: Apr. 9, 1982

[30] Foreign Application Priority Data

Apr. 10, 1981 [FR] France ............................ 81 07206

[51] Int. Cl.$^3$ .............................................. G02F 1/13
[52] U.S. Cl. ...................................... 350/342; 350/320
[58] Field of Search ................................ 350/342, 320

[56] References Cited

U.S. PATENT DOCUMENTS

| | | | |
|---|---|---|---|
| 3,592,527 | 7/1971 | Conners et al. ...................... | 350/342 |
| 3,732,429 | 5/1973 | Braunstein et al. .............. | 350/342 X |
| 3,824,002 | 7/1974 | Beard ................................... | 350/342 |
| 3,960,439 | 6/1976 | Becker et al. . | |
| 4,037,932 | 7/1977 | Haas et al. . | |
| 4,368,386 | 1/1983 | Huignard et al. .............. | 350/342 X |

FOREIGN PATENT DOCUMENTS 2404271 4/1979 France .
2005857 4/1979 United Kingdom .

OTHER PUBLICATIONS

Haas, W. E. L. et al., "Ultralow-Voltage Image Intensifiers," *Applied Physics Lett.*, vol. 29, No. 10, (Nov. 1976), pp. 631–632.

*Primary Examiner*—John K. Corbin
*Assistant Examiner*—Richard Gallivan
*Attorney, Agent, or Firm*—Oblon, Fisher, Spivak, McClelland & Maier

[57] ABSTRACT

A display device is provided using a liquid crystal layer associated with a photoconducting plate, in which the voltage applied to the valve is an AC voltage chosen so as to transfer to the liquid crystal a maximum signal, and that applies more especially to radioscopy and to the projection of coherent (laser reading) or incoherent images.

2 Claims, 5 Drawing Figures

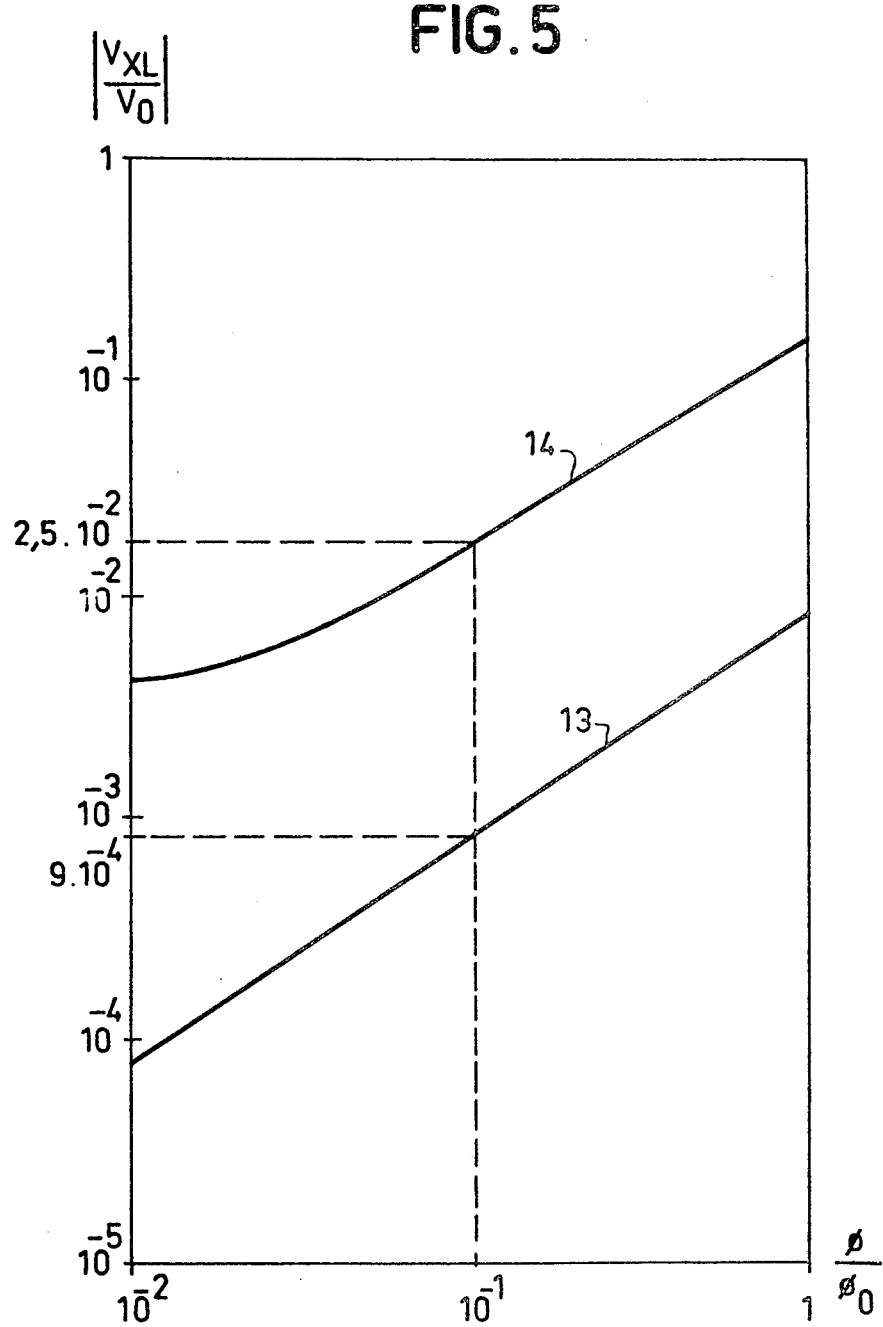

LIQUID CRYSTAL OPTICAL VALVE CONTROLLED BY PHOTOCONDUCTING EFFECT

BACKGROUND OF THE INVENTION

The present invention relates to liquid crystal optical valves controlled by photoconducting effect which may serve as image converters. These devices use a cell, subjected to an electric biassing voltage distributed between a thin layer of liquid crystal and a photoconducting plate joined to this layer. It concerns more particularly the display of images produced by X rays in radioscopy or radiography, and the projection of images in incoherent light as well as use in data processing devices using coherent radiation, (for example an optical correlator).

Such a cell is based on the following known effects: on the one hand, the property which mesomorphic materials have of modulating an optical radiation depending on an electric field which is applied to them and, on the other hand, the property of photoconducting materials whose electric resistance is reduced when receiving an incident light radiation.

Mesomorphic materials are made of elongated molecules that can be orientated in the presence of a solid wall, in a common direction which may be either parallel or perpendicular to the plane of the wall. The direction of this orientation depends on the respective natures of the liquid crystal material and of the wall. The orientation of the long molecules of the liquid crystal is further greatly facilitated by the introduction of traces of appropriate surfactants in the mesomorphic material as well as by previous treatment of the walls in contact with the film (rubbing the wall, evaporation under grazing incidence of a film of silicon oxide). Depending on the effect desired, a mesomorphic material will be used presenting one or other of the three phases: smectic, nematic or cholesteric. In devices using a photoconductor associated with a liquid crystal, generally a nematic type of liquid crystal is used. Here briefly are some of the different uses of such liquid crystals.

The long molecules which form mesomorphic materials present pronounced dielectric anisotropies: consequently, they tend to orientate themselves parallel or perpendicular to an electric field depending on whether this anisotropy is positive or negative. Thus, by gripping a plate of nematic material between two transparent electrodes subjected to a variable DC or AC electric voltage, it can be seen, if the material presents a positive dielectric anisotropy and is disposed in parallel orientation, that beyond a threshold voltage (of the order of 1 to 5 volts for a film of a thickness of 10 microns or so) that the birefringence of the plate measured perpendicularly to its plane decreases when the applied voltage is increased: the molecules tending to orientate themselves parallel to the field. Conversely, for a nematic material having a negative dielectric anisotropy subjected to the same field as before, the birefringence increases when the applied voltage is increased. This effect, called "controlled birefringence", if the voltage applied to a nematic film disposed between parallel or crossed polarizers can be varied locally, allows the intensity of monochromatic light transmitted by the plate or the color of polychromatic light to be modulated spatially. According to a known technique, it is also possible to use the dielectric and optical anisotropic properties of the nematic materials for electrically controlling the light transmitted by a thin layer by using the so-called "twisted nematic" structures. The intensity of the light transmitted by the layer will depend on the voltages applied locally to this layer.

Another way of controlling the light transmitted or reflected by a nematic liquid crystal cell is based on the "dynamic diffusion" phenomenon which appears beyond a second threshold voltage and which very quickly masks the birefringence phenomenon. Like controlled birefringence, dynamic diffusion is perfectly reversible. However, by adding to the nematic material a small percentage of cholesteric material, a mixture is obtained endowed with a memory. By application of an AC voltage at a frequency higher than the control voltage the mixture can be brought back to its initial transparent state.

In the patent application field in France on Sept. 23rd, 1977, under the national registration number 7 728 738 and entitled "Dispositif de visualisation comportant une couche mince de cristal liquide accolée à une lame photoconductrice", the Applicant has described a device using a nematic phase liquid crystal layer joined to a photoconducting material plate. To the cell formed by the association of liquid crystal and the photoconducting material is applied a bias voltage. In this device, the voltages applied to the cell may be very high all the more so since sensitivity of this cell to writing radiation increases when the value of the control voltage increases. In this case, the control voltage may reach 1000 V and approximate the breakdown voltage of the cell.

The present invention proposes reducing the biasing voltage to a much lower value by using an AC voltage whose frequency is chosen as a function of the dynamic potentiometric operation. Thus the sensitivity of the cell may be increased without fearing the breakdown voltage and the size and the price of the control voltage generator reduced. The reading radiation may pass through the valve or be reflected by a layer disposed for this purpose.

SUMMARY OF THE INVENTION

The invention provides a liquid crystal optical valve controlled by photoconducting effect: said valve comprising two electrodes forming a capacitor connected to a bias voltage generator, a liquid crystal layer joined to a photoconducting material plate, the whole being disposed between said electrodes, a transparent support medium placed on the same side as said layer, said plate being intended to receive optical control radiation and said layer being intended to optically modulate another radiation, wherein said generator is an an AC voltage generator; the frequency of said AC voltage is between a lower limit equal to the inverse of the space charge time constant of said photoconducting material and an upper limit corresponding to the frequency at which the variation of the voltage transmission ratio presents a point of inflexion.

BRIEF DESCRIPTION OF THE DRAWINGS

Other aspects and advantages of the invention will be better understood from the following description, given by way of non limiting example, as well as from the accompanying figures in which:

FIGS. 4 and 5 are explanatory diagrams.

DESCRIPTION OF THE PREFERRED EMBODIMENT

Figure 1:
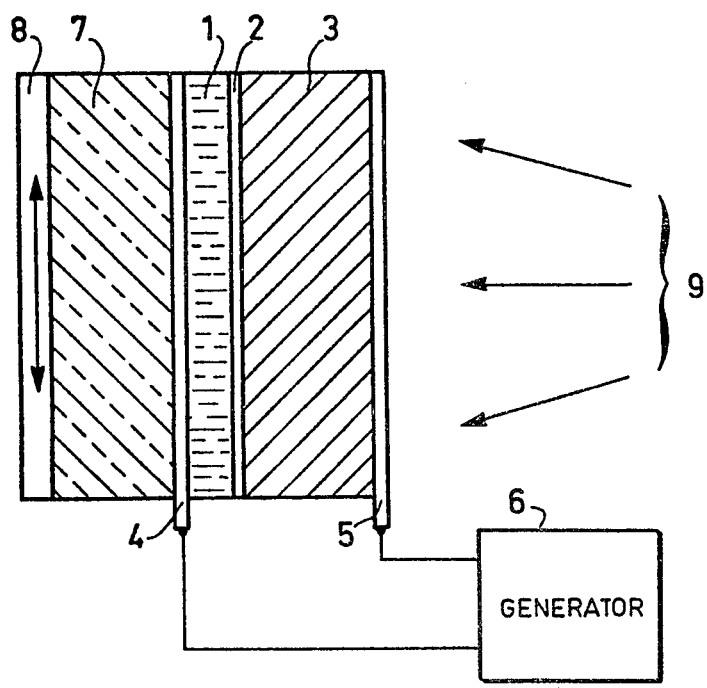
FIG. 1 shows a cell of the invention comprising a liquid crystal layer joined to a plate of photoconducting material.

FIG. 1 shows an optical valve comprising a liquid crystal layer 1, a plate 3 of photoconducting material and, if required, an intermediate reflecting layer 2 for the reading radiation, providing electric coupling between layer 1 and plate 3, such that in the plane of this intermediate layer short-circuiting of the different potentials which may appear therein does not occur. The optical valve further comprises two electrodes 4 and 5 for applying the AC voltage from generator 6, a support plate 7 placed on the liquid crystal layer side for supporting electrode 4 and in the case where the reading radiation is polarized light radiation, a polarizing plate 8 joined to support 7. This cell receives on the photoconducting side a writing radiation 9. Electrode 5 and the assembly formed by electrode 4 and support plate 7 must be respectively transparent to the radiation forming the writing beam 9 and to another radiation used for reading the written image. Electrodes 4 and 5 may be formed by a layer of tin or indium oxide of a thickness of a few tens of micrometers deposited by cathode spraying, or by a mixture of these oxides. If the writing radiation is X radiation, a layer of about a thousand angstroms thickness of a metal having a low atomic number will be preferably used for electrode 5.

In the case of reading by reflection, layer 2 which must have low lateral conductivity must also be reflecting. To ensure passage of the current between the photoconducting plate 3 and the liquid crystal layer 1, a layer may be adopted made from a mosaic of metal pellets. Different multi-electric layer compositions with high reflection coefficient answer these requirements.

In the embodiment of FIG. 1, the liquid crystal layer is formed by a mesomorphic material appearing in nematic phase at ambient temperature, of a thickness of about 15 micrometers. The mesomorphic material is chosen so as to present a negative or positive dielectric anisotropy depending on the effect desired. In the case where a liquid crystal memory layer is required, a nematic-cholesteric mixture will be used. In the case where the liquid crystal layer has a twisted structure, the reading radiation is polarized linearly and the analysing means are linear analysis means. The relative dielectric constant of these materials is of the order of 10.

Figure 2:
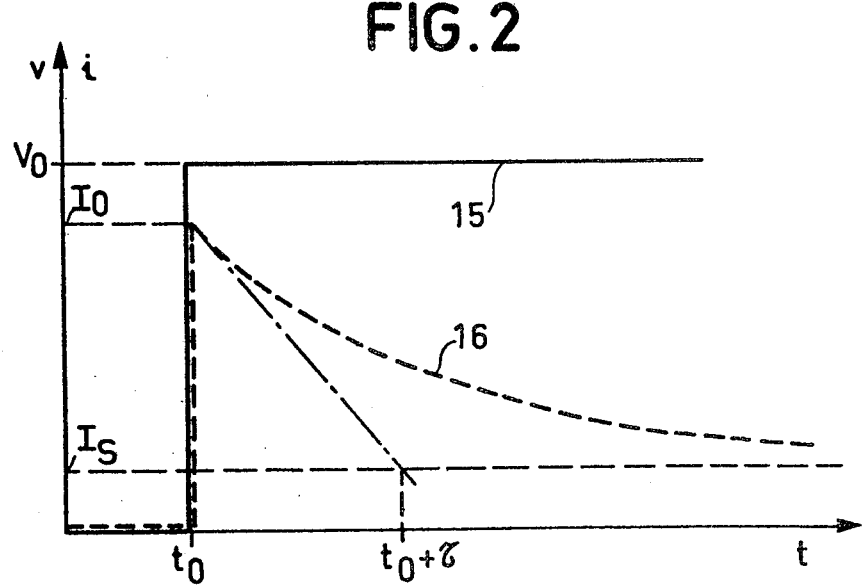
FIG. 2 is an explanatory diagram.

The photoconducting material forming plate 3 is in the example of FIG. 1 a mixed bismuth and silicon oxide (BSO). It may be advantageously chosen so as to present good transparency in a part at least of the spectrum corresponding to visible light. Its resistivity in the absence of illumination is of the order of $10^{14}$ Ωcm and decreases by about 1000 times for 1 mW lighting in the near ultra violet. These materials may be in the form of plates sufficiently thick for them to act as support media in the optical valve. In accordance with the invention, the photoconducting material used comprises traps. The photoconducting effect, because of the existence of traps in a monocrystalline or polycrystalline material may be analysed as follows. The traps are impurity atoms uniformly distributed in the volume of the photoconducting material. They are capable of capturing an electron or a hole which are diffused from the location where they were generated by photonic excitation. When a photoconducting plate is illuminated, the incident photons which have sufficient energy may create electron-hole pairs. If an electric field is applied to the plate, the electrons and the holes are driven towards the electrodes. For a DC electric field, the electrons are attracted by the positive electrode and the holes towards the negative electrode. The charge carriers created in the material by the ionizing radiation or by the photonic excitation are trapped in a region of the volume where a space charge appears which substantially reduces the transport of the electric charges. These phenomena are illustrated in FIG. 2 which shows the law of variation of the current i flowing through an irradiated photoconducting plate to which there is applied at time $t_o$ a voltage level Vo represented by the curve 15. The current measured in the external circuit represented by curve 16 decreases exponentially with a time constant $\tau$; the value reached at saturation is Is<<Io (Io: initial current). This behaviour is characteristic of a space charge limited current. The following contribute to the establishment of the space charge:

the electrodes surrounding the photoconductor and capable of being partially disabling, the trap levels in the photoconductor, the time constant $\tau$ related to the retrapping of the photoelectrons and proportional to $1/\Phi.Np$ where $\Phi$ is the incident optical power density on the crystal and Np the number of traps. Under established operating conditions, the current in the external circuit is low, which makes this switching means inefficient when it is a question of providing the voltage control of a liquid crystal layer. According to the invention, the situation may be different when an AC voltage is applied to the photoconductor. If the frequency of the AC voltage is sufficiently great with respect to $1/\tau$, the space charge in the photoconductor has not the time to form and the current measured in the external circuit is close to Io. Under these conditions, the voltage transferred to the liquid crystal is considerable and contributes to efficiently controlling the optical modulation which this liquid crystal allows to obtain.

Figure 3:
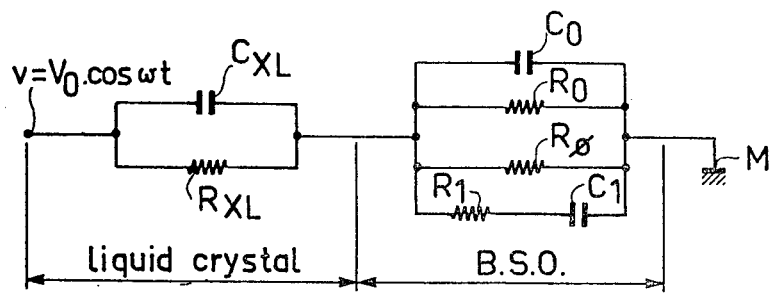
FIG. 3 is an equivalent electric diagram of the cell illustrated in FIG. 1.

To make clearer the choice of the operating conditions, there is shown in FIG. 3 the equivalent diagram of the cell illustrated in FIG. 1. FIG. 3 applies to dynamic operation with an AC bias voltage. This diagram is in the form of a potentiometer formed of two legs connected in series to the bias source. The source supplies a voltage $v = Vo. \cos \omega t$; one of its terminals is connected to ground M. The left leg corresponds to the liquid crystal 1, that at the right to the photoconducting plate 3. The liquid crystal layer is shown by a leak resistance $R_{xl}$ in parallel across a capacity $C_{xl}$. For the photoconducting plate, the elements of FIG. 3 show:

Ro: darkness resistance of the photoconductor,

Co: capacity of the photoconductor connected as a capacitor, $R_\phi$: variable resistance under illumination $\Phi(R_\phi$ decreases when the illumination increases), $R_1$, $C_1$: series dipole characterizing the development under transient operating conditions of the space charge, the product $R_1.C_1$ being equal to the time constant $\tau$ illustrated in FIG. 2.

Figure 4:
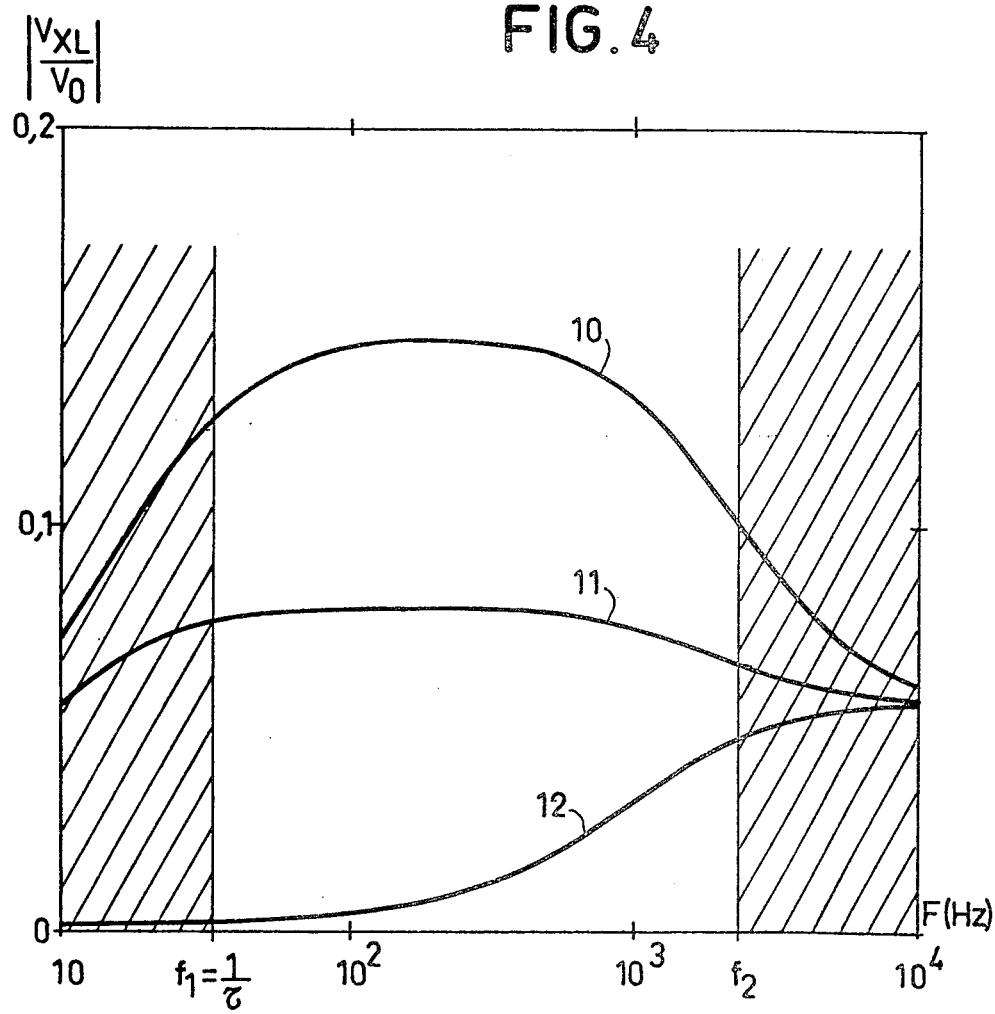

In the example considered, the photoconducting plate has a thickness of 2 mm and the time constant $\tau$ is of the order of 30 ms for a level of illumination $\Phi = 2$ mW/cm$^2$, which corresponds to a frequency of 33.3 Hz. An interesting characteristic of the system is the curve giving the voltage applied to the liquid crystal compared with the voltage applied to the cell as a function of frequency. This is what is shown in the graph of FIG. 4 which is an experimental record for a voltage delivered by the generator: $v = v_0 \cos \omega t$ and for an illumination level $\Phi \simeq 14$ mW.cm$^{-2}$.

Curve 10 was plotted for an illumination $\Phi \simeq 14$ mW.cm$^{-2}$, curve 11 under illumination $\Phi/2$ and curve 12 in darkness. The following comments will relate to curves 10 and 11, that is under illumination. With a DC or at low frequency, because of the space charge effect, the voltage transferred to the liquid crystal is low for, as can be seen in the diagram of FIG. 3, the influence of the dipole R1 C1 is great. With the frequency increasing, the dipole R1 C1 tends to comprise only resistance R1 which follows from the fact that the space charge in the photoconductor has not the time to be established ($f \gg 1/\tau$) and the voltage transferred to the liquid crystal increases. For frequencies between 100 Hz and 1000 Hz, the characteristics 10 and 11 present flat considerably separated parts. On the other hand, for frequencies greater than 1000 Hz, it can be seen that the ratio $|V_{xl}/V_o|$ tends for all the characteristics towards a single value. The best use of the cell is then situated in the frequency range corresponding to the flat regions of the characteristics 10 and 11. To define this frequency range of use, the low frequency $f_1 = 1/\tau = 1/R_1 \cdot C_1$ can be taken as lower limit and as upper limit the high frequency $f_2$ which corresponds to the position of the inflexion point of the curve $|V_{xl}/V_o|$ as a function of the frequency. Since $f_2$ is much greater than $1/\tau$, the space charge in the photoconductor has not the time to form and the dipole $R_1 C_1$ is reduced to $R_1$. Thus, the effect of $R_1$ may be included in $R\Phi$. Under these conditions, i.e. with incident illumination: $R\Phi \ll R_o$, the diagram of FIG. 4 is reduced to two RC dipoles.

A simple calculation gives $|V_{xl}/V_o|$ as a function of $R\Phi$, $C_o$, $R_{xl}$, $C_{xl}$ and:

$$\left| \frac{V_{XL}}{V_o} \right| = k \sqrt{\frac{1 + a\omega^2}{1 + b\omega^2}}$$

where $\omega$ is the angular frequency with $k = R_{xl}/R_{xl} + R\Phi$, $a = R\Phi^2 \cdot C_o^2$ and $b = (R\Phi \cdot R_{xl}/R\Phi + R_{xl})^2 (C_o + C_{xl})^2$ It can be seen that the second derivative is cancelled out for:

$$\omega_2^2 = \frac{-1 + \sqrt{1 + 3 \cdot \frac{a}{b}}}{3a}$$

A photoconducting plate of a thickness of 2 mm under an illumination level of 1 mW.cm$^{-2}$ (for a wavelength of 450 angstroms) presents practically the same resistance as the liquid crystal layer of a thickness of 15 microns (about $10^9 \Omega$). On the other hand, with the thickness of the liquid crystal layer much smaller than that of the photoconducting plate: $C_{xl} \gg C_o$ It follows that:

$$f_2 = \frac{1}{2\pi \sqrt{2}} \cdot \frac{R + R_{XL}}{R \cdot R_{XL}} \cdot \frac{1}{C_{XL}}$$

The cell will operate with an efficiency all the higher the greater the ratio $|V_{xl}/V_o|$. The frequencies $f_1$ and $f_2$ are limit frequencies in use. The frequency of the generator will be chosen in the unhatched part of FIG. 4 so that:

$f_1 \ll f \ll f_2$ to have optimum operation of the system.

The advantages presented by operation under AC voltage are clearly shown in FIG. 5. In this figure, two curves are shown in a graph giving the voltage at the terminals of the liquid crystal compared with the voltage at the terminals of the cell with respect to an illumination level $\Phi$ compared with a level $\Phi_o$ corresponding to the saturation of the photoconductor. These are voltage transfer curves. Curve 13 has been plotted for a DC operating voltage and curve 14 for an AC voltage at a frequency of 100 Hz. It can be seen that for the same level of illumination of the cell, the voltage transferred to the liquid crystal is much higher for operation at the frequency of 100 Hz than for DC operation. By way of example for $\Phi/\Phi_o = 1/10$, $|V_{xl}/V_o| = 9 \times 10^{-4}$ for a DC voltage and $2.5 \times 10^{-2}$ for an AC voltage at a frequency of 100 Hz. Consequently, the voltage transferred to the liquid crystal is about 30 times higher for operation under AC voltage than for operation under DC voltage. This is an important advantage of the invention. Since the elements forming the cell are linear in their electric representations, the voltage at the terminals of the liquid crystal is deprived of any DC component which contributes to extending the life of the cell.

What is claimed is:

1. A method for producing an image in a liquid crystal device, said device comprising:

two electrodes forming a capacitor;

a liquid crystal layer between said two electrodes;

a photoconductive material plate disposed between said electrodes to one side of said liquid crystal layer;

and a transparent support medium on the outside of the electrode which is nearest said liquid crystal layer;

and said method for producing an image comprising:

receiving optical control radiation by said plate;

modulating another source of optical radiation by said layer;

determining a first frequency equal to the inverse of the space charge time constant of said photoconductive material;

determining a second frequency equal to the frequency at which the voltage transmission ratio as a function of frequency presents a point of inflexion;

connecting said electrodes to an AC voltage generator having a frequency that is between a lower limit equal to said first frequency and an upper limit equal to said second frequency.

2. The method of claim 16 wherein said liquid crystal layer consists of at least one mesomorphic material disposed with uniform orientation at least in the absence of writing radiation.

* * * * *